UNITED STATES PATENT OFFICE.

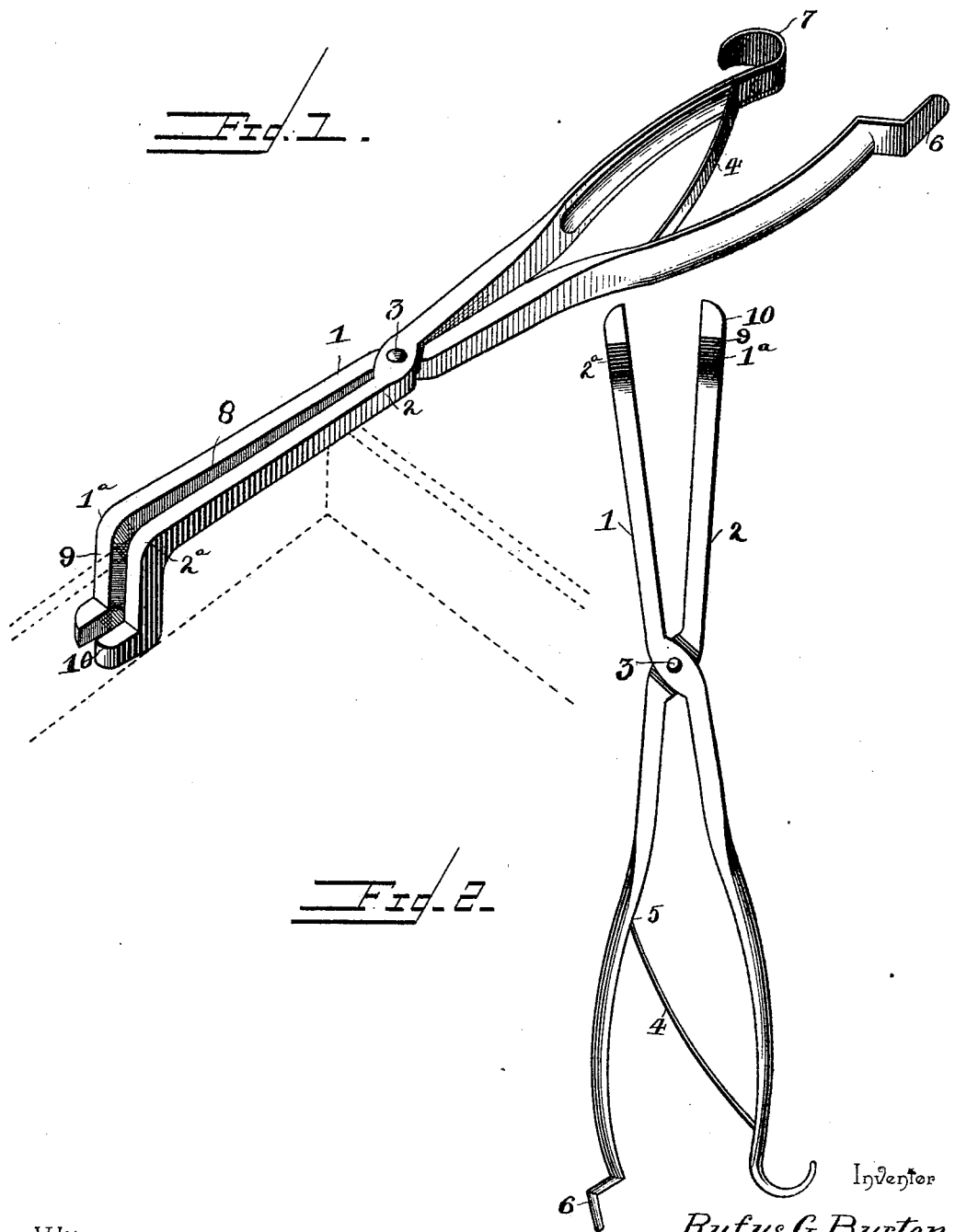

RUFUS G. BURTON, OF BLUEFIELD, WEST VIRGINIA.

KITCHEN-TONGS.

SPECIFICATION forming part of Letters Patent No. 613,355, dated November 1, 1898.

Application filed July 28, 1897. Serial No. 646,198. (No model.)

*To all whom it may concern:*

Be it known that I, RUFUS G. BURTON, a citizen of the United States, residing at Bluefield, in the county of Mercer and State of West Virginia, have invented a new and useful Kitchen-Tongs, of which the following is a specification.

My invention relates to kitchen-tongs, and particularly to tongs adapted for use in connection with the culinary art, and has for its object to provide tongs especially adapted for conveniently and safely lifting pans, kettles, pots, stove-lids, &c., but more particularly designed for use in connection with flat comparatively shallow pans wherein the walls are of small height, while the bottoms are of considerable area. The difficulty in raising pans of this class resides in the fact that they are liable to twist or slip in the tongs, and it is particularly difficult to so handle a pan of this class as to pour out the contents thereof without the risk of disengaging the tongs or other holding devices therefrom. Therefore an important object of my present invention is to provide tongs of such a construction as to grasp a pan of this class at the side instead of at the front, as in the ordinary practice, a long bearing of the jaws of the tongs being obtained upon the wall of the pan, and the jaws being so constructed that by simply turning the wrist the operator is enabled to tilt the same to discharge its contents.

Further objects and advantages of this invention will appear in the following description, and the novel features thereof will be particularly pointed out in the appended claim.

In the drawings, Figure 1 is a perspective view of tongs constructed in accordance with my invention applied in the operative position to a pan, the latter being indicated in dotted lines. Fig. 2 is a plan view of the tongs with the members thereof in their normal or spread position.

Similar numerals of reference indicate corresponding parts in both figures of the drawings.

The members 1 and 2 of the tongs embodying my invention are pivotally connected, as at 3, and are yieldingly held in their normal or spread position by means of an actuating-spring 4, which is attached to one of the members contiguous to its rear end and terminally bears in a groove 5 in the other member. The rear ends of the handle portions, which are formed by outwardly convexing the rear portions of the members 1 and 2, are respectively offset to form a stove-lifter 6 and curved or segmentally bent to form a hook 7, by which the tool may be suspended upon a hook or whereby it may be attached with facility to a suitable portion of the wearing-apparel of the cook. This hook may be engaged with kettle-bails.

The members 1 and 2 are extended beyond their pivotal point of connection to form jaws $1^a$ and $2^a$, each jaw being parallel-sided and having its inner surface serrated, as shown at 8, said serrated surfaces forming a cleaning and sharpening means for use in connection with cutlery and also facilitating the frictional contact of the jaws with an article grasped by means of the tongs. The jaws are offset, as shown at 9, in a common direction, and the extremities of the offset portions are upset to form feet or studs 10 equal in length and having rounded outer sides. The extremities of these feet are flush and the inner surfaces thereof which, in common with the inner surfaces of the offset portions 9, are roughened or serrated are adapted to bear in opposite directions upon the side of a vessel, such as a pan, which is grasped by the tongs.

Inasmuch as the feet or studs at the extremities of the jaws are coextensive, it is obvious that in grasping a vessel the pressure applied to the opposite surfaces of its side is applied to coextensive areas, and hence there is no liability of bending or otherwise distorting the vessel.

The offset portions of the jaws by extending outwardly to locate the feet contiguous to the bottom of the pan enable the pan to be supported by means of the tongs without the liability of twisting or tilting. In other words the jaws, constructed as described, give a firm purchase upon a vessel to be lifted, and thus add materially to the efficiency of the device.

In grasping a flat shallow pan of the "bake-pan" class the extended jaws are arranged parallel with the side of the pan, (the term "side" being used in contradistinction to "front," or that side which is ordinarily grasped by means of tongs constructed as in the common practice,) the offset portions 9 of the jaws extending downwardly perpendicular to the bottom of the pan, while the body portions of the jaws incline slightly upward toward the pivot by which the members of the tongs are connected. Obviously one of these jaws contiguous to the pivot extends over the front wall of the pan or that wall facing the operator, but it is desirable to obtain a long bearing of the jaws upon the side wall of the pan, and hence the preferable downward and forward inclination of the jaws in use. In order to still further extend the longitudinal bearing of the jaws upon the side wall of the pan, the feet 10 are provided, and inasmuch as the feet engage the wall of the pan close to the bottom of the latter, while the body portions of the jaws engage the wall contiguous to and approximately parallel with its upper edge, it is obvious that the operator is enabled to effectually maintain the pan in a horizontal position or to tilt the same, conveniently, to discharge its contents by a simple twist of the wrist.

It will be understood that while I have designated the utility of this device as being applied particularly to culinary operations it is not necessarily limited thereto. The device as described is capable of various uses analogous to those set forth, and also to a variety of uses in connection with a laundry, &c., which it is deemed unnecessary to mention in this connection.

Various changes in the form, proportion, and the minor details of construction may be resorted to without departing from the spirit or sacrificing any of the advantages of this invention.

Having described my invention, what I claim is—

The herein-described tongs for the purpose named, having pivotally-connected spring-actuated members, consisting of handles, extended beyond their pivotal points to form straight flat-faced cross-sectionally rectangular jaws, alined respectively with the handles, and provided, at a point remote from the pivot, with downturned portions 9, of less length than, and offset in a common direction approximately perpendicular to, the body portions of the jaws, and terminating in coextensive feet or studs 10, perpendicular to the offsets 9, and spaced from the plane of the body portions to engage a pan on lines approximately parallel therewith, said jaws, including their offset portions and the feet or studs, having serrated contiguous faces, substantially as specified.

In testimony that I claim the foregoing as my own I have hereto affixed my signature in the presence of two witnesses.

RUFUS G. BURTON.

Witnesses:
ANDREW J. HONAKER,
JOHN V. BROWN.